Figure 1:
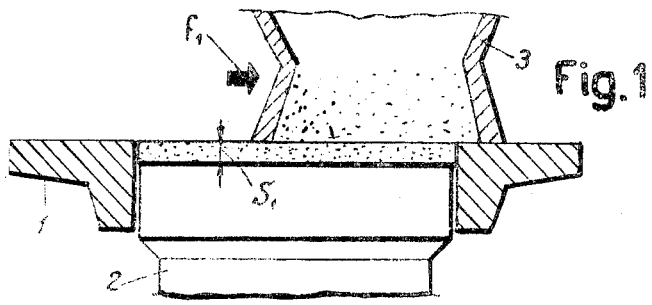
Figure 2:
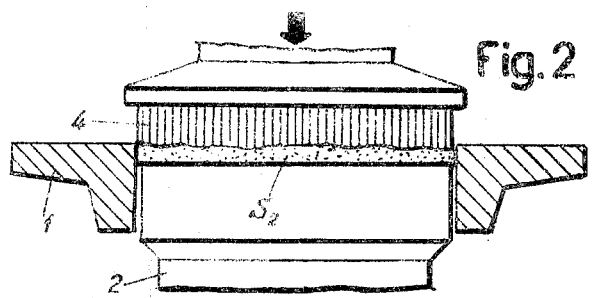
Figure 3:
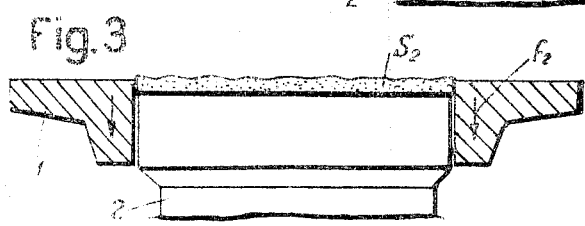

Aug. 30, 1966    E. LONGINOTTI    3,270,113
PRODUCTION OF DECORATIVE TILES AND WALL AND FLOOR SURFACES
Filed Feb. 11, 1964    2 Sheets-Sheet 1

INVENTOR
ENRICO LONGINOTTI
BY
E. M. Squire
ATT'Y.

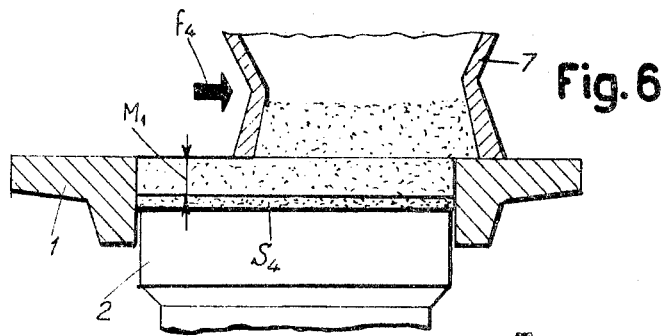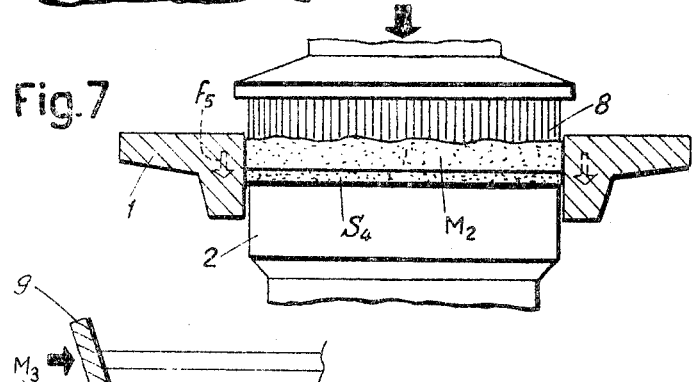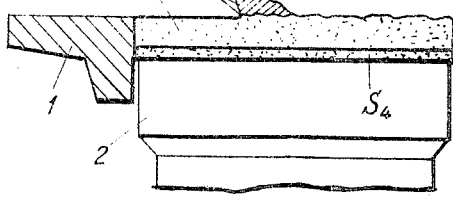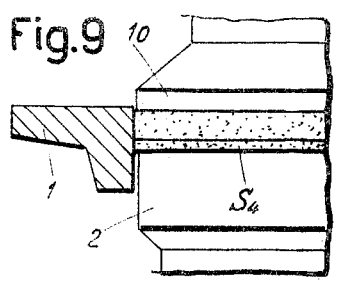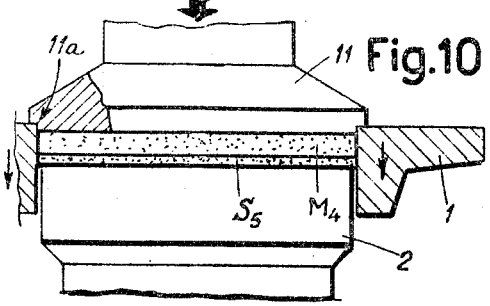

United States Patent Office 3,270,113
Patented August 30, 1966

3,270,113
PRODUCTION OF DECORATIVE TILES AND
WALL AND FLOOR SURFACES
Enrico Longinotti, Viale Donato Giannotti 75,
Florence, Italy
Filed Feb. 11, 1964, Ser. No. 343,985
Claims priority, application Italy, Feb. 13, 1963, 3,184/63
4 Claims. (Cl. 264—245)

The invention relates to a method for producing relatively thin coloured tiles for lining wall and floor surfaces.

In particular the invention resides in making tiles with a uniform facing of a coloured material. The coloured material is generally more expensive than the uncoloured or natural colour material, and the use of the present invention permits the quantity of coloured material to be reduced without impairing the appearance of the finished product.

According to one aspect of the invention a method of manufacturing thin coloured cement tiles comprises the steps of elastic pressing an initial charge of a relatively thin layer of coloured facing material having a relatively high degree of moisture to render the layer of uniform density, performing a first trimming or scraping to remove material in excess of the desired thickness which is at the most equal to the minimum thickness of the material after the elastic pressing, loading a second charge of less moist material on top of the first layer, rendering the density of the second charge uniform by a second elastic pressing, performing a second scraping or trimming to remove the material in excess of the desired thickness which is at the most equal to the minimum thickness assumed after said second elastic pressing, performing a breather or vent pressing, and then, a final forced pressing.

Wet and moist as used herein are comparative terms and are not to be taken as meaning the material is saturated or necessarily sensibly wet. The upper limit of moisture will normally be 20% of the total weight of the wet material, and the moisture content should not appreciably impair the free running properties of the powdered material.

The necessary criteria for the elastic pressings and the skimming or trimming stages are set out in my abandoned copending application Serial No. 343,986, filed February 11, 1964.

Advantageously, after the first elastic pressing and the first scraping or trimming of the wetter and more expensive material, a so-called plastifying pressing is effected to ensure a higher uniformity of density in the layer of coloured material which is to form the visible layer.

The various operations can be effected in a plurality of positions of a multiple-position machine by means of reciprocal movements of a lower and upper pad relative to a frame and by suitable scraping or trimming means.

The method according to the invention may conveniently be performed by means of apparatus comprising a die cavity within which a lower pad is movable to define the bottom of a mould whose sides are defined by the walls of the die cavity, an upper pad for exerting pressure on the material in the mould, a skimming or trimming tool for removing material in excess of a certain thickness, hoppers for introducing material into the mould, and means for moving the pads relative to the die cavity. Preferably the die cavity is a through bore in a frame.

An embodiment of the invention will now be described, by way of example, with reference to the accompanying drawings, in which:

FIGURES 1 to 10 illustrate successive stages in the manufacture of a thin cement tile.

The drawings show a lower "support" pad 2 inside a die cavity of a frame 1, which pad defines, in conjunction with the die cavity, the mould for the tile materials.

In FIG. 1 the upper surface of the pad 2 is a distance $S_1$ below the upper surface of the frame 1. A hopper 3 is provided for supplying a coloured or other facing material in a relatively moist state to fill the die cavity. This hopper moves horizontally in the direction of the arrow $f_1$ and in the reverse direction to charge into the die cavity a layer of the facing material having a depth which is equal to the distance $S_1$. The pad and the frame meantime remain fixedly positioned and locked together. After the hopper is removed from the top of the frame 1, a resiliently yieldable pad 4 is applied to yieldingly press the layer to substantially equalize the density thereof. After this pressing the surface of the layer may be irregular, as shown by $S_2$ in FIG. 2, depending on the unevenness in density of the charge from the hopper.

Figure 4:
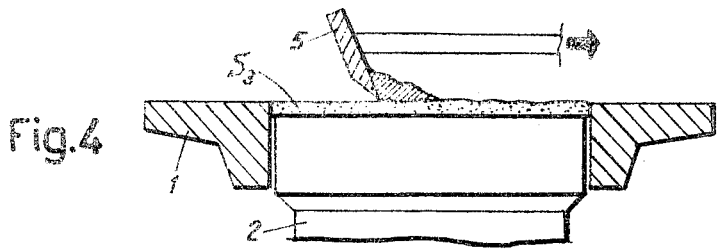

The difference in level between the upper surfaces of the frame and the pad is then reduced, for example, by lowering the frame 1 in the direction of the arrow $f_2$ (FIG. 3) to permit trimming the layer, as shown in FIG. 4, to a uniform thickness which must, of course, be, at the most, substantially equal to the desired uniform thickness of the layer $S_2$. The trimming takes place, for example, by means of a scraper blade 5, to the level of the upper surface of the frame 1.

Figure 5:
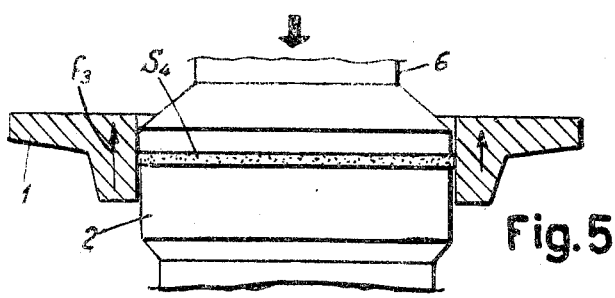

As illustrated in FIG. 5, after the trimming operation, there is a plasticizing pressing of the material forming the layer in order to obtain a pressed layer $S_4$ which becomes plastified by virtue of the moisture content thereof. The plastifying pressing is done with a pad 6, as shown in FIG. 5, and during this pressing operation, there may occur a relative movement between the pads 2 and 6 and the frame 1. This gives the required difference of level between the pad 2 and the frame 1 to accommodate the second layer of material. The frame 1 can be moved upwardly in the direction of the arrow $f_3$ of FIG. 5 to achieve this movement.

In FIG. 6, there is shown the loading stage of a second layer comprising drier and cheaper material which will form the greater part of the finished tile. Said loading is effected, as shown in FIG. 6, through the horizontal movement of a hopper 7 in the direction of the arow $f_4$ and in the reverse direction in order to form over the layer $S_4$ a layer M having a thickness $M_1$ equal to the difference of level between the frame 1 and the pad 2 less the thickness of the coloured or facing layer $S_4$.

FIG. 7 illustrates a second elastic pressing with a resiliently yieldable pad 8 on the combined first and second layers M and $S_4$ so as to form a layer $M_2$ on the layer, the layer $S_4$ remaining substantially unchanged. The layer $M_2$ may have an irregular thickness depending on the uniformity or non-uniform nature of the original layer M, but as a result of the resilient pressing, the layer $M_2$ becomes uniform in density. During or after this stage, the frame 1 is moved downwardly as shown by the arrow $f_5$ of FIG. 7. In this way, the arrangement of FIG. 8 is obtained. Material of the layer $M_2$ in excess of the desired thickness is trimmed off by a scraper blade 9. A layer $M_3$ of material of uniform thickness and density is thus obtained overlying the first or facing layer $S_4$. The scraper blade 9 is shown diagrammatically in FIG. 8 and operates advantageously at the level of the upper surface of the frame 1.

After scraping to obtain uniform thickness a breather or vent pressing stage by means of a pad 10, as shown in FIG. 9, occurs. The breather or vent pressing is made in conventional manner for relatively dry material.

FIG. 10 illustrates the final pressing stage. A pressing pad 11 and the pad 2 are moved relative and towards each other, for example, by lowering the pad 11 in the direction of arrow $f_6$ of FIG. 10. The frame 1 may be entrained and forced downwardly by the pad 11 by virtue of a step 11a therein, in such a manner that the tile formed by the layers $S_5$ and $M_4$, at the end of the forced pressing, is located only slightly below the upper surface of the frame 1. The withdrawal stage is therefore facilitated and shortened owing to the relative movement of the pad 2 with respect to the frame 1.

This process produces very thin cement tiles with the visible surface coloured. The tiles are of a low moisture material, but have a uniformity of density and degree of compression so that a substantial uniformity of colour in any condition of use of the obtained material is attained. It may be stated, by way of guidance, that the final pressures—for cement material—may be of the order of 300 kilos/sq. cm. The water in the material is between 5% and 20% of the total weight, the moisture of the coloured layer S preferably being above 12% and that of the backing layer M lower than 10%.

These tiles can be made into floor or wall linings as usual. The drawing only illustrates one embodiment. The invention is capable of adaptation to be varied in form and arrangement without however departing from the scope of the inventive concept as defined in the claims.

What I claim is:

1. The method of forming a cementitious tile which comprises the steps of: adjusting the relative positions of a die having an upper flat surface and a frame member having a flat upper surface, said frame member having an aperture formed therein which cooperates with said die to define a molding chamber, said adjusting step defining a chamber having a first depth; filling said chamber with a charge of a first cementitious powdered material level with said upper surface of said frame member; yieldingly pressing the upper surface of said charge to render the density of said charge substantially uniform throughout the charge, the thickness of said charge varying in accordance with its initial density distribution; readjusting the relative positions of said die and said frame member to reduce the depth of said chamber to a second depth not exceeding the minimum thickness of said charge after said yieldingly pressing step; scraping the upper surface of said charge to produce a layer of said first material which is of uniform thickness; readjusting the relative positions of said die and said frame member to increase the depth of said chamber to a third depth greater than said first depth; filling the space in said chamber above said first material with a charge of a second powdered cementitious material level with the upper surface of said frame member; yieldingly pressing the upper surface of said charge of second material to render the density of said charge substantially uniform throughout the charge, the thickness of said second charge varying in accordance with its initial density distribution; again readjusting the relative positions of said die and said frame member to reduce the depth of said chamber to a fourth depth not exceeding the combined minimum thicknesses of said first and second materials after the second of said yieldingly pressing steps; scraping the upper surface of said charge of second material to produce a uniform combined thickness for said first and second materials; and applying pressure to the upper surface of said charge of second material to compress both of said materials simultaneously, said last named pressure applying step utilizing a rigid flat surface cooperating with said flat upper surface of said die.

2. The method according to claim 1, wherein said first filling step is performed using a first material which is colored to form a facing of a desired color for said tile, the quantity of said first material being materially less than the quantity of said second material, said second material, when said tile is installed, being concealed by said facing of said first material.

3. The method according to claim 1, further comprising a step intermediate said steps of scraping said charge of said first material and said step of filling said space with said second material, said intermediate step consisting of applying pressure to said first material using a rigid flat surface cooperating with said upper flat surface of said die, the first of said filling steps being performed using a powdered first material having a moisture content in the range from 12% to 20% by weight, whereby said first material becomes plasticized by said intermediate pressing step.

4. The method according to claim 1, wherein the first of said filling steps is performed using a first material having a moisture content in the range from 12% to 20% and the second of said filling steps is performed using a second material having a moisture content in the range from 5% to less than 10%, the quantity of said second material being materially greater than the quantity of said first material.

References Cited by the Examiner

UNITED STATES PATENTS

| | | | |
|---|---|---|---|
| 1,019,414 | 3/1912 | Bellamy | 264—256 XR |
| 1,453,382 | 5/1923 | D'Alessandro et al. | 264—256 XR |
| 2,101,540 | 12/1937 | Gullich | 264—245 |
| 2,195,683 | 2/1940 | Ross et al. | 25—99 |
| 2,208,054 | 7/1940 | Reed | 25—97 |
| 2,970,361 | 2/1961 | Brown | 25—99 |
| 3,179,730 | 4/1965 | Ingrassia | 264—245 |

FOREIGN PATENTS

| | | |
|---|---|---|
| 215,190 | 5/1928 | Australia. |

ROBERT F. WHITE, *Primary Examiner.*

J. A. FINLAYSON, *Assistant Examiner.*